US012664164B1

(12) United States Patent
Godbole et al.

(10) Patent No.: US 12,664,164 B1
(45) Date of Patent: Jun. 23, 2026

(54) SYSTEMS AND METHODS FOR FEDERATED TASK PERFORMANCE CONTROLLED BY AGENTS

(71) Applicant: Instabase, Inc., Dover, DE (US)

(72) Inventors: Shaunak Godbole, San Francisco, CA (US); Shih Ping Chang, San Francisco, CA (US); Clemens Mewald, Lafayette, CA (US); Anant Bhardwaj, San Francisco, CA (US)

(73) Assignee: Instabase, Inc., Dover, DE (US)

( * ) Notice: Subject to any disclaimer, the term of this patent is extended or adjusted under 35 U.S.C. 154(b) by 0 days.

(21) Appl. No.: 18/677,124

(22) Filed: May 29, 2024

(51) Int. Cl.
*G06F 16/2453* (2019.01)
*G06F 16/2458* (2019.01)

(52) U.S. Cl.
CPC .... *G06F 16/24542* (2019.01); *G06F 16/2471* (2019.01)

(58) Field of Classification Search
CPC .......... G06F 16/24542; G06F 16/2471; G06F 40/30; G06F 16/334; G06F 21/62; G06N 20/00; G06N 5/02; G06N 3/0475; G06N 5/04
USPC .................................................... 706/12, 46
See application file for complete search history.

(56) References Cited

U.S. PATENT DOCUMENTS

| | | | | |
|---|---|---|---|---|
| 7,783,568 B1 * | 8/2010 | Fracchia | ................ | G06Q 20/10 |
| | | | | 705/41 |
| 9,542,563 B2 * | 1/2017 | Baessler | ................. | H04L 63/10 |
| 2009/0254904 A1 * | 10/2009 | Howard | ............... | G06F 9/5072 |
| | | | | 718/100 |
| 2014/0101079 A1 * | 4/2014 | Deal | ...................... | G06N 5/045 |
| | | | | 706/12 |
| 2020/0244605 A1 * | 7/2020 | Nagaraja | ................. | H04L 51/02 |
| 2023/0136564 A1 * | 5/2023 | Goyal | ...................... | G06N 5/02 |
| | | | | 706/46 |
| 2024/0202225 A1 * | 6/2024 | Siebel | .................... | G06N 3/045 |
| 2024/0378389 A1 * | 11/2024 | Rose | ....................... | G06F 40/30 |
| 2025/0190449 A1 * | 6/2025 | Zhang | ................... | G06F 16/288 |
| 2025/0217194 A1 * | 7/2025 | Desgarennes | ......... | G06F 9/5027 |

* cited by examiner

*Primary Examiner* — Dennis Truong
(74) *Attorney, Agent, or Firm* — Esplin & Associates, PC

(57) ABSTRACT

Systems and methods for providing federated task performance controlled by agents are disclosed. Exemplary implementations may: receive user input representing a user prompt that entails a set of operations; generate a plan for executing the set of operations, including a first and second operation; provide a first prompt to a first client agent to execute the first operation; provide a second prompt to a second client agent to execute the second operation; generate and present a reply to the user prompt based on replies from the first and second client agents, and/or perform other steps.

18 Claims, 3 Drawing Sheets

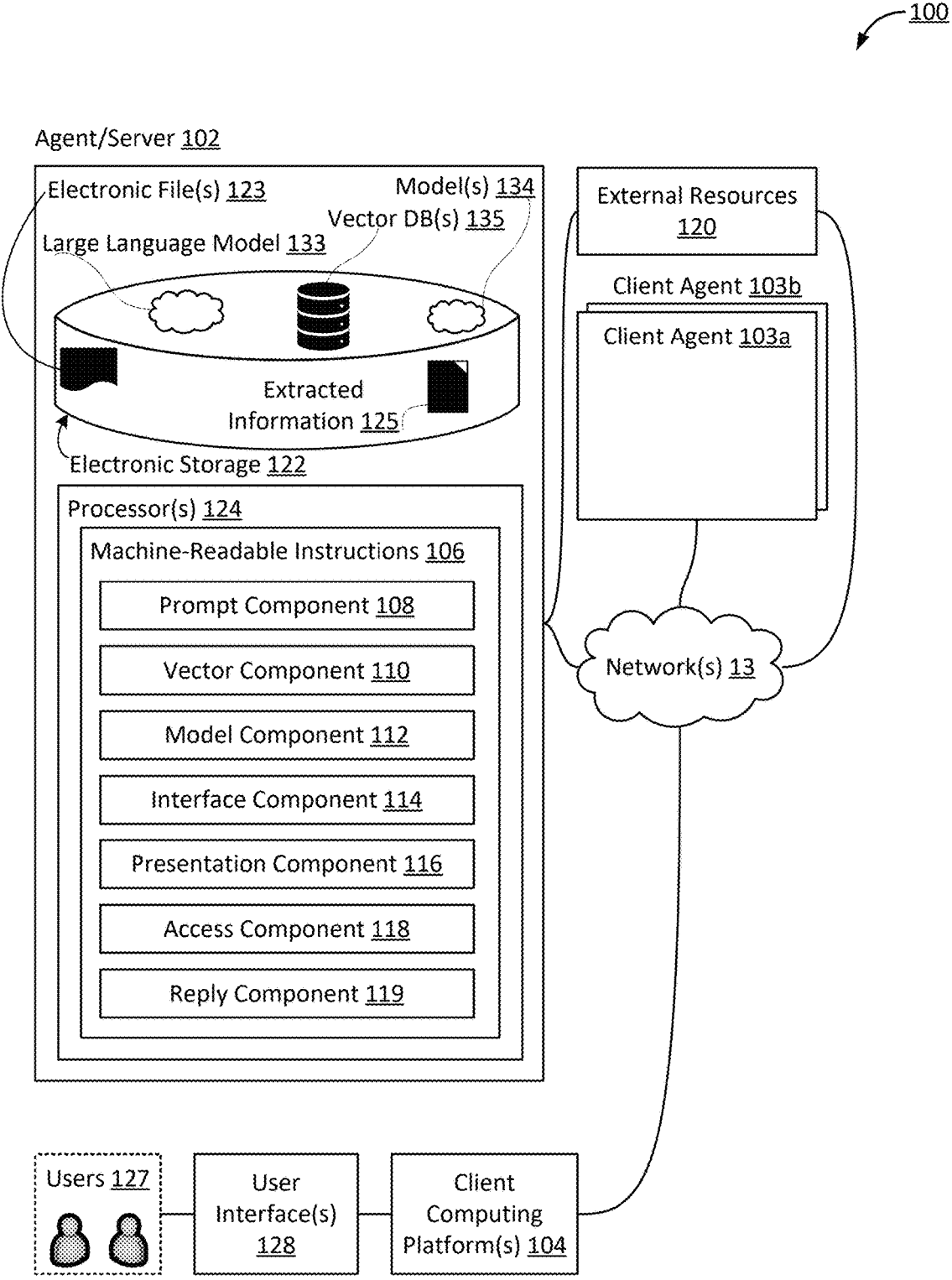

100

Agent/Server 102

Electronic File(s) 123          Model(s) 134
                                Vector DB(s) 135
Large Language Model 133

Extracted
Information 125

Electronic Storage 122

Processor(s) 124

Machine-Readable Instructions 106

Prompt Component 108

Vector Component 110

Model Component 112

Interface Component 114

Presentation Component 116

Access Component 118

Reply Component 119

External Resources
120

Client Agent 103b

Client Agent 103a

Network(s) 13

Users 127          User
                   Interface(s)          Client
                   128                    Computing
                                          Platform(s) 104

Fig. 1

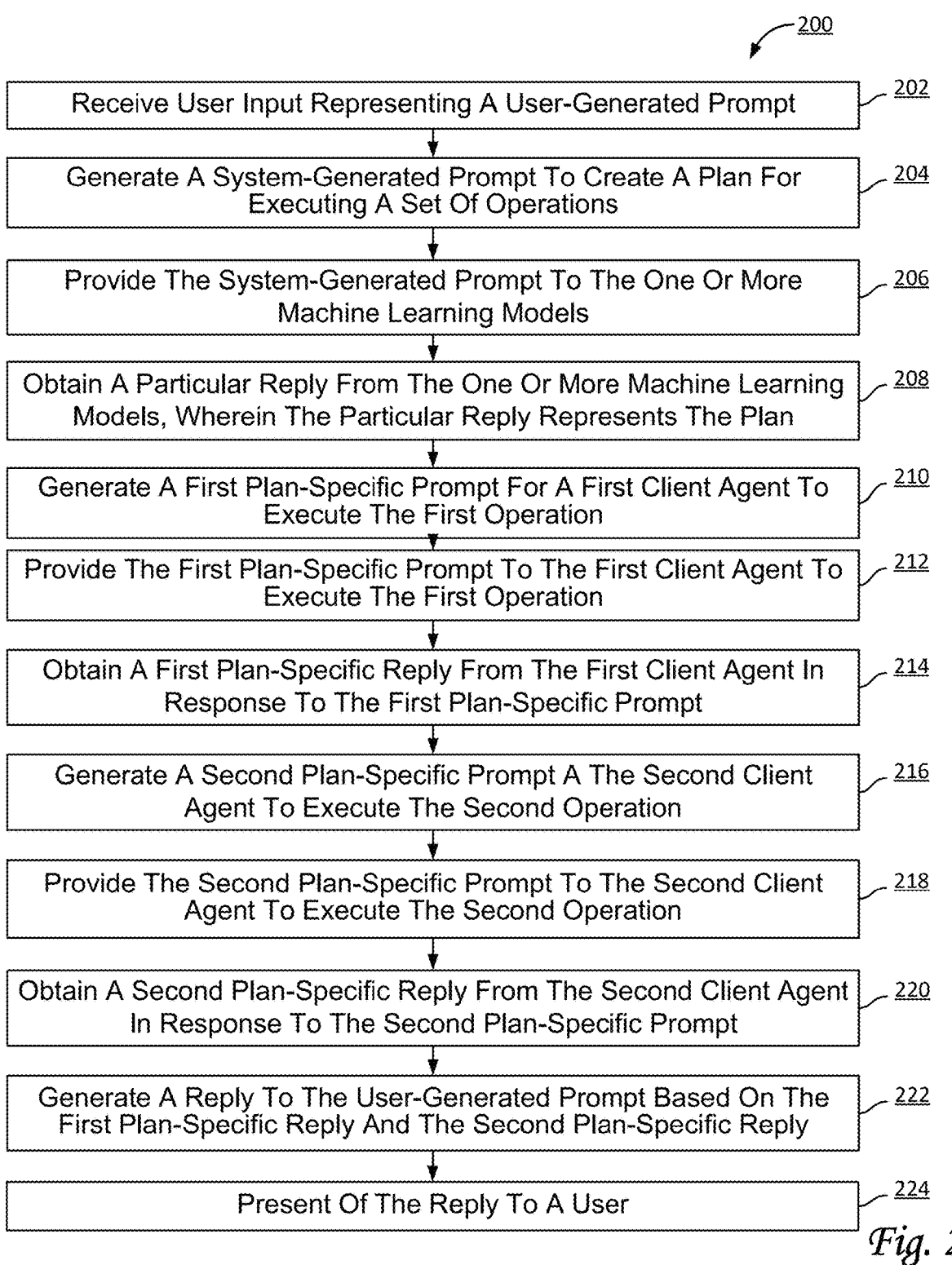

200

Receive User Input Representing A User-Generated Prompt — 202

Generate A System-Generated Prompt To Create A Plan For Executing A Set Of Operations — 204

Provide The System-Generated Prompt To The One Or More Machine Learning Models — 206

Obtain A Particular Reply From The One Or More Machine Learning Models, Wherein The Particular Reply Represents The Plan — 208

Generate A First Plan-Specific Prompt For A First Client Agent To Execute The First Operation — 210

Provide The First Plan-Specific Prompt To The First Client Agent To Execute The First Operation — 212

Obtain A First Plan-Specific Reply From The First Client Agent In Response To The First Plan-Specific Prompt — 214

Generate A Second Plan-Specific Prompt A The Second Client Agent To Execute The Second Operation — 216

Provide The Second Plan-Specific Prompt To The Second Client Agent To Execute The Second Operation — 218

Obtain A Second Plan-Specific Reply From The Second Client Agent In Response To The Second Plan-Specific Prompt — 220

Generate A Reply To The User-Generated Prompt Based On The First Plan-Specific Reply And The Second Plan-Specific Reply — 222

Present Of The Reply To A User — 224

Fig. 2

SYSTEMS AND METHODS FOR FEDERATED TASK PERFORMANCE CONTROLLED BY AGENTS

FIELD OF THE DISCLOSURE

The present disclosure relates to systems and methods for providing federated task performance controlled by agents, in particular artificial intelligence (AI) agents.

BACKGROUND

Some applications and uses of retrieval-augmented generation (RAG) are known, including but not limited to extracting information from electronic files. Presenting information in user interfaces is known. Large language models (LLMs) are known. Using a machine learning model (such as, e.g., an LLM) to generate a set of operations that will, upon execution, perform one or more tasks may be known.

SUMMARY

One aspect of the present disclosure relates to a system configured to provide federated task performance controlled by agents. The system may include one or more hardware processors configured by machine-readable instructions. The system may be configured to receive user input representing a user prompt that entails, implies, and/or otherwise indirectly relates to a set of operations, even if these operations are not stated explicitly. The system may be configured to generate a plan for executing the set of operations, including a first and second operation. The system may be configured to provide a first prompt to a first client agent to execute the first operation. The system may be configured to provide a second prompt to a second client agent to execute the second operation. The system may be configured to generate and present a reply to the user prompt based on replies from the first and second client agents. The system may be configured to perform other steps.

Another aspect of the present disclosure relates to a method of providing federated task performance controlled by agents. The method may include receiving user input representing a user prompt that entails, implies, and/or otherwise indirectly relates to a set of operations, even if these operations are not stated explicitly. The method may include generating a plan for executing the set of operations, including a first and second operation. The method may include providing a first prompt to a first client agent to execute the first operation. The method may include providing a second prompt to a second client agent to execute the second operation. The method may include generating and presenting a reply to the user prompt based on replies from the first and second client agents. The method may include performing other steps.

In some implementations, some of the tasks performed may use Retrieval-augmented generation (RAG). For example, RAG may be used for electronic files (including electronic documents and/or other digital content, e.g., stored in file storages, databases, and/or other electronic storage) that are too numerous and/or large to be used in their entirety for a machine learning model such as, e.g., a large language model. Different sets of electronic files may be hosted, controlled, and/or located at different locations. In some implementations, the system may operate as a group of agents that individually perform retrieval-augmented generation (RAG) on individual corresponding vector databases. This group may be referred to as a federation of agents, and the resulting operation as federated task performance controlled by agents.

As used herein, any association (or relation, or reflection, or indication, or correspondency) involving servers, processors, agents, sub-systems, client computing platforms, electronic files, formats, documents, blocks of content, characters, vectors, vector embeddings, presentations, extracted information, user interfaces, user interface elements, fields, portions, queries, tasks, replies, prompts, operations, models, representations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1 illustrates a system configured for providing federated task performance controlled by agents, in accordance with one or more implementations.

FIG. 2 illustrates a method of providing federated task performance controlled by agents, in accordance with one or more implementations.

DETAILED DESCRIPTION

Figure 3:
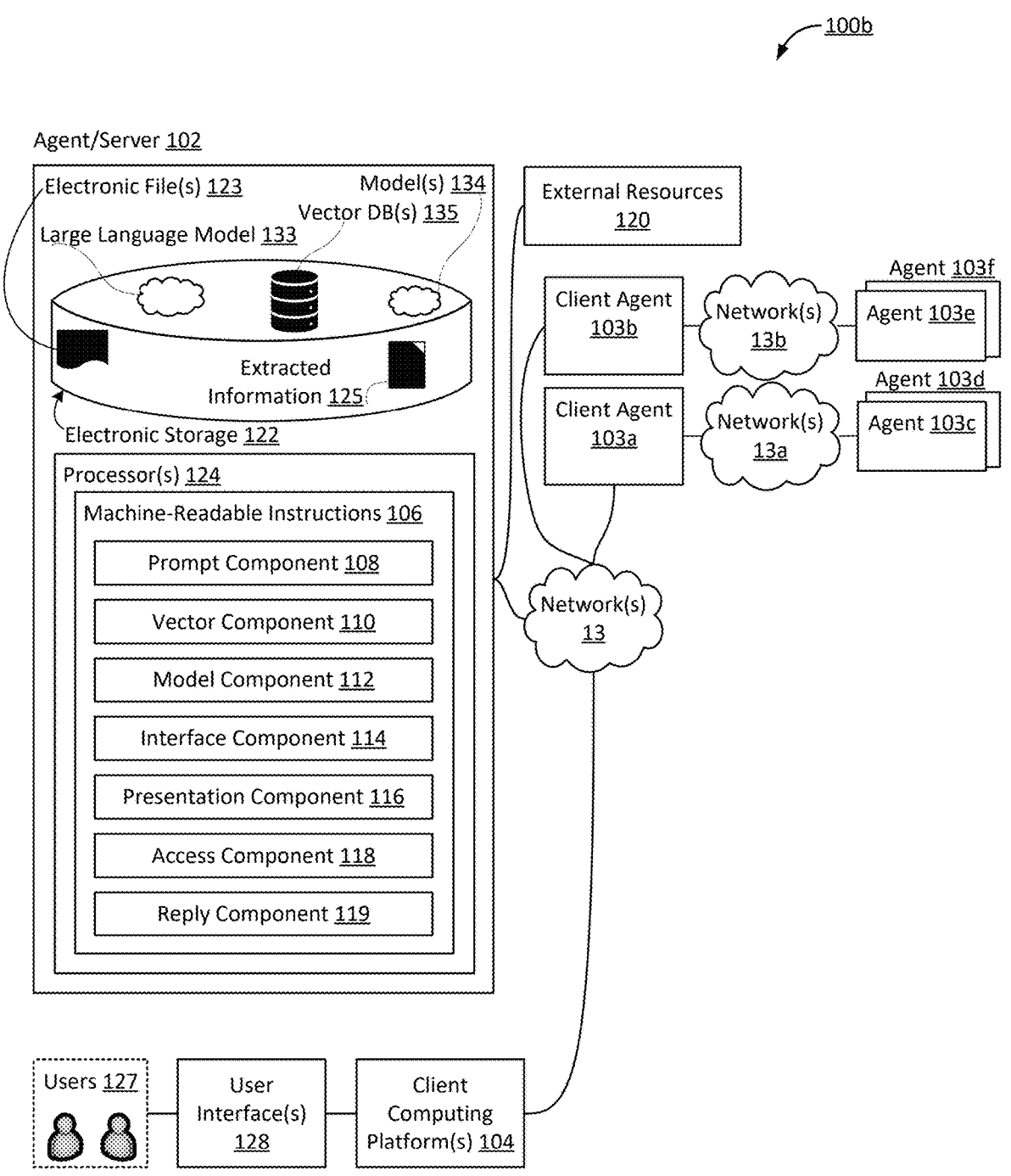
FIG. 3 illustrates a system configured for providing federated task performance controlled by agents, in accordance with one or more implementations.

FIG. 1 illustrates a system 100 configured to provide federated task performance controlled by agents, such as, e.g., AI agents. Operations by system 100 may use one or more models 134 (which may include one or more machine learning models) to process, analyze, and/or operate on a set of one or more (electronic) files 123, in accordance with one or more implementations. Users of system 100 should only be able to retrieve, use, and/or modify information from those electronic files they have access to and/or are otherwise allowed to access. As used herein, the term "agent" may refer to a software-controlled entity or object configured to respond to prompts based on rules, programming, and/or other internal logic, wherein responses include one or more of actions taken, operations executed, and/or (textual and/or audiovisual) replies provided. In some cases, an agent perceives its environment and takes actions in order to achieve goals. A large language model (LLM) in and of itself may not be considered as an agent if it has no goal, but an LLM can be used as a component of an agent. By way of non-limiting example, agent/server 102 depicted in FIG. 1 may function as an agent that controls (federated) task performance in system 100.

In some implementations, system 100 may include agent/server 102, one or more client computing platforms 104, one or more user interfaces 128, external resources 120, a large language model 133, one or more other models 134, and/or other components. System 100 and/or agent/server 102 may be configured to communicate with one or more client computing platforms 104 according to a client/server architecture and/or other architectures. Client computing platform(s) 104 may be configured to communicate with other client computing platforms via agent/server 102 and/or according to a peer-to-peer architecture and/or other architectures. Users 127 may access system 100 via client computing platform(s) 104. In some implementations, individual user interfaces 128 may be associated with individual client computing platforms 104.

By virtue of the systems and methods disclosed herein, a user may use one or more models 134 (e.g., a machine learning model such as large language model 133) to extract information from (or generate information based on) a set of electronic files. For implementations using RAG, the set of electronic files may be sufficiently large (e.g., spanning at least 200 pages) that using the entirety of the set as context exceeds the capacity (e.g., in pages, vectors, tokens, and/or in another measure of information quantity) of an individual machine learning model (e.g., from one or more models 134) to be used as context. Instead, a prompt-specific subset or portion of the set of electronic files may be used as context. Access to particular electronic files by one or more models 134 should correspond to access to the same electronic files by the particular user currently using system 100. In other words, system 100 supports access control for its users.

System 100 may operate as a group of agents that individually perform tasks and/or operations. This group may be referred to as a federation, and the resulting operation may be referred to as federated task performance controlled by agents. The operations of this system or federation may be controlled centrally, by an element or component referred to as agent/server 102 (or "central agent", as opposed to the other "client agents"). Agent/server 102 may determine which operations (or prompts) should be handled by, delegated to, and/or otherwise controlled by which client agents. One of the inputs, conditions, and/or requirements for system 100 or for this central agent may be the type of access control to use. For example, if a particular user should not have access to a particular client agent, the central agent may not delegate a particular (sub) prompt to that particular client agent. In some implementations, system 100 may operate hierarchically, with agent/server 102 at the top of the hierarchy and client agents at the bottom of the hierarchy.

Agent/server 102 may be configured by machine-readable instructions 106. Machine-readable instructions 106 may include one or more instruction components. The instruction components may include computer program components. The instruction components may include one or more of a prompt component 108, a vector component 110, a model component 112, an interface component 114, a presentation component 116, an access component 118, a reply component 119, and/or other instruction components.

Some components may be configured to obtain and/or retrieve electronic files, including but not limited to electronic files 123, including scanned images, captured photographs, and/or other electronic files in electronic format. As used herein, the terms "electronic file" and "electronic source document", and derivatives thereof, may be used interchangeably. Multiple electronic files may form a set of electronic files. For example, the set of electronic files may be provided as input and/or context for extracting information.

Some components may be configured to create and/or otherwise determine document segments from a file, a page, a document, and/or a set thereof. As used herein, document segments may be referred to as document chunks. For example, a document segment may be a portion or segment of a file, a page, an electronic file, and/or a set thereof. For example, a particular document segment may be one or more paragraphs or sentences of a document. In some cases, a particular document segment may be a caption, a title, a header, and/or a footer of a document. In some cases, a particular document segment may be a partial or entire column, row, list, table, database, and/or other structured information element contained within a file or document. A set of document segments may be created from a set of one or more electronic files. In some cases, the set of one or more electronic files may span at least 200 pages, at least 300 pages, at least 400 pages, at least 500 pages, and/or another minimum number of pages (or, in some cases, a minimum quantity of information). In some cases, the quantity of information in a set of one or more electronic files may be defined and/or determined not (merely) by page count, but rather by a number of segments, a number of tokens, a number of vector embeddings, and/or combinations thereof. In some implementations, the creation of document segments may be based on the type of contents (e.g., prose, natural language, structured information, tables, databases, etc, etc.).

In some implementations, some components of system 100 may be configured to create combinations of individual document segments. For example, a particular combination may be used as context for one or more models 134 (e.g., a machine learning model such as large language model 133). In particular, the particular combination may be used as context for a prompt provided to large language model 133. In some implementations, a combination of individual document segments may include those document segments that are associated with a particular subset of vector embeddings, in particular, a subset of vector embeddings that has been determined and/or selected by vector component 110 and/or another component of system 100.

In some implementations, some components of system 100 may obtain and/or access electronic files forming a corpus of electronic files, and/or a set of electronic files. By way of non-limiting example, the electronic formats of the files may be one or more of Portable Electronic file Format (PDF), Portable Network Graphics (PNG), Tagged Image File Format (TIF or TIFF), Joint Photographic Experts Group (JPG or JPEG), and/or other formats. Electronic documents may be stored and obtained as electronic files. In some implementations, an electronic file may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/or other financial documents.

As used herein, electronic files may be referred to as "source electronic files" when the electronic files are originally published, generated, produced, communicated, and/or made available, or when the electronic files are copies thereof. Alternatively, and/or simultaneously, electronic files may be referred to as "source electronic files" when the electronic files are a source of human-readable information, a basis for human-readable information, or a container for human-readable information.

The electronic formats used for at least some of the electronic files in system 100 may be suitable and/or intended for human readers, and not, for example, a binary format that is not suitable for human readers. For example, the electronic format referred to as "PDF" is suitable and intended for human readers when presented using a particular application (e.g., an application referred to as a "pdf reader"). In some implementations, particular electronic file 123 may represent one or more of a bank statement, a financial record, a photocopy of a physical document from a government agency, and/or other electronic files. For example, a particular electronic file 123 may include a captured and/or generated image and/or video. For example, a particular electronic file 123 may be a captured and/or generated image.

Interface component 114 may be configured to receive user input representing user-generated prompts, e.g., through user interfaces 128. A particular user-generated prompt may entail and/or include a set or sequence of tasks and/or operations, whether explicitly or implicitly (i.e., without listing all individual tasks and/or operations). For example, a set of operations may include a first operation, a second operation, and so forth (these may be referred to as sub-tasks). In some implementations, a first operation may be associated with a first set of electronic files, a second operation may be associated with a second set of electronic files, and so forth. In some implementations, a particular (compound) operation may depend on other operations as input (or for input), e.g., on the first operation, the second operation, etc. As used herein, the terms "tasks" and/or "operations" refer to electronic tasks and/or electronic operations that can be performed by manipulating electronic systems and/or devices.

In some cases, a particular user-generated prompt explicitly defines operations and/or a logical sequence and/or relation between operations. In other cases, a particular user-generated prompt can be converted (e.g., through using large language model 134) into a logical sequence of (sub) operations, which may include and/or require the use of other tools, such as calculators, translators, summarizers, database access tools (e.g., to create database instructions/queries), and/or other tools. In some implementations, a sequence of (sub) operations can be used to generate and/or create one or more agent prompts (or sub-prompts, e.g., through using large language model 134). For example, a first (plan-specific) prompt may be generated based on a first operation, a second (plan-specific) prompt may be generated based on a second operation, and so forth. For example, a first reply to the first prompt may be based on the content of the first set of electronic files (e.g., controlled in a first location, which may correspond to a first local vector database), a second reply to the second prompt may be based on the content of the second set of electronic files (e.g., controlled in a second location, which may correspond to a second local vector database used), and so forth. As used herein, the term "reply" encompasses not only textual, audio-visual, and/or alphanumerical content, but also the execution of an operation, an action being taken, and/or a status code signifying the performance of a task. For example, a first reply may create an entry for a particular file, a particular database, a particular blockchain, and/or other mechanism to store information, and the subsequent second reply may signify that this entry has been added to the particular file, the particular database, and/or the particular blockchain, etc. In some implementations, interface component 114 may operate, and be referred to, as the (central) agent controlling federated task performance in system 100. In some implementations, individual (client) agents (such as, by way of non-limiting example, client agent 103a, client agent 103b, etc.) may include an interface component similar to interface component 114, configured to convert a particular (compound) prompt into smaller prompts, and/or answer a particular prompt using one or more replies.

Specific user input may be associated with specific users, or groups of users. Individual users or groups of users may have particular access rights and/or permissions regarding certain electronic files (or folders, or sets of electronic files, or blob storage, and/or another system of records). For example, a particular type of access control governs whether a given user can access a given electronic file (or particular storage, e.g., a particular GOOGLE™ drive). In some cases, access control may be based on the location(s) of the given user and/or the given electronic file, such as for a particular business unit or (corporate) department. In some cases, access control may be based on the role and/or responsibility of the given user, e.g., based on a hierarchy in a (corporate) enterprise. In some cases, access control may be based on the identity of the given user (e.g., individual users are associated with a personal account and password, and each user input is associated with a user). System 100 may use one or more of these types of access control for its operation. In some cases, access control by system 100 may be as fine-grained as the access control for electronic files 123, or for portions of particular electronic files.

Prompt component 108 may be configured to generate (system-generated) prompts, e.g., for one or more machine leaning models 134 (e.g., a machine learning model such as large language model 133). In some implementations, functionality of prompt component 108 may occur in response to and/or based on user input received from users. In particular, prompt component 108 may generate a particular system-generated prompt for one or more machine leaning models 134 to create a plan for executing a particular set of operations (as entailed by a particular user-generated prompt). For example, the particular system-generated prompt may produce a particular plan for executing a first operation, a second operation, and so forth. Prompts generated by prompt component 108 may include context for the one or more machine leaning models 134, including but not limited to references and/or other information regarding sets of electronic files, examples, warnings, restrictions, available tools, and/or other information the one or more machine leaning models 134 can use to provide a reply to the prompts and/or otherwise execute operations. In some cases, functionality attributed to prompt component 108 may be performed by other components of system 100, including but not limited to model component 112. For example, a particular system-generated prompt may be generated by a central agent (such as, e.g., agent/server 102). In some cases, prompt component 108 may generate plan-specific prompts for client agents (e.g., to execute operations).

Vector component 110 may be configured to convert content within sets of electronic files into sets of vector embeddings, particularly for implementations using RAG. Vector component 110 may be configured to provide (parts of) electronic files (e.g., document segments as created and/or determined) to a machine learning model 134 (e.g., an embedding model as provided by OPENAI™, an embedding model based on or derived from Bidirectional Encoder Representations from Transformers (BERT), an embedding model based on GOOGLE's WORD2VEC™, etc.) for converting and/or otherwise creating vector embeddings. Vector embeddings represent semantic and/or textual information in electronic files numerically through hyperdimensional vectors. In some implementations, one or more machine learning models 134 (e.g., an embedding model and/or large language model 133) may be external to system 100. For example, system 100 may interact with one or more machine learning models 134 through one or more application programming interfaces (APIs). In some implementations, one or more machine learning models 134 (e.g., an embedding model and/or large language model 133) may be agent-specific (i.e., specific to an individual agent such as, e.g., client agent 103a, client agent 103b, etc.) and/or local, e.g., to a particular set of electronic files.

Content within different sets of electronic files may be converted into different sets of vector embeddings. In some implementations, a vector embedding may refer to content that can change over time, such as, e.g., content in a database. For example, a particular vector embedding may refer to metadata of a particular database and/or a location in the particular database where particular information is stored. Vector databases 135 may include a first vector database, a second vector database, a third vector database, and so forth. Different sets of vector embeddings may be stored in different vector databases 135. For example, content within a first set of electronic files stored and/or controlled at a first location may be converted into a first set of vector embeddings (and/or references) and stored in a first vector database 135, e.g., in electronic storage at the first location. For example, content within a second set of electronic files stored and/or controlled at a second location may be converted into a second set of vector embeddings (and/or references) and stored in a second vector database 135, e.g., in electronic storage at the second location. For example, content within a third set of electronic files stored and/or controlled at a third location may be converted into a third set of vector embeddings (and/or references) and stored in a third vector database 135, e.g., in electronic storage at the third location, and so forth. For certain types of electronic files, such as databases and other files that can or may be modified repeatedly, vector embeddings may refer to metadata and/or to a location in such a particular electronic file (e.g., in a particular database) where particular information is stored. In some cases, an individual vector embedding (for particular information) remains relevant and/or useful even after some content of the particular electronic file has been modified. In some implementations, a particular set of electronic files stored and/or controlled at a particular location may be associated with particular access rights, e.g., within a (corporate) organization, such that certain users have access to (some or all of) the particular set of electronic files, while others have no or limited access. For example, file systems commonly support one or more types of access control regarding electronic files.

Vector component 110 may be configured to store vectors and/or other information in vector database(s) 135 and/or other storage, including but not limited to electronic storage 122. Vectors embeddings (or simply "vectors") may represent semantic information. As used herein, vectors may represent what text means by a set of numbers, sometimes referred to as text embeddings. Such vectors may have hundreds or thousands of dimensions, and the values for these dimensions may be stored and/or organized in an array of floating point numbers. For example, model component 112 may create a vector that semantically represents a particular prompt. In some implementations, model component 112 may use one or more models 134 to determine and/or create vector embeddings.

Access component 118 may be configured to verify whether particular users have access to particular electronic files 123, folders, and/or file systems. Access component 118 may be configured to perform and/or support different types of verifications, including but not limited to types of verification based on user identifiers, on user characteristics, on user locations, on user access rights, on user permissions, on user role or responsibility, and/or on other information particular to users, or based on any combination of these. In some implementations, certain verifications may be performed centrally, e.g., by a central agent such as agent/server 102 in FIG. 1. In some implementations, certain verifications may be performed locally, e.g., by a client agent such as client agent 103a, client 103b, and/or another agent. By way of non-limiting example, one type of verification is to verify whether a particular reply (from one or more models 134 such as large language model 133) is responsive (i.e., an appropriate response) to the corresponding prompt. For example, a particular verification may verify whether a particular reply appears to include one or more hallucinations. Some verifications are accompanied by a statistical probability, such as 90% odds a reply does not contain a hallucination.

For a particular type of client-level access control, a central agent verifies whether a particular user has access to the particular set of electronic files corresponding to a particular vector database. In some cases, client-level access control is location-based. For example, responsive to a particular user having access to electronic files in a particular location, the same user may have access to the corresponding vector database. For example, for a particular type of role-based access control (RBAC), an agent may verify whether a particular user has access to (a particular part of) a particular electronic file (e.g., a particular database). In some cases, role-based access control may use identity passthrough. For example, responsive to a particular user having access to a particular cell in the particular database (e.g., upon a determination that this particular cell contains information relevant to a particular sub-prompt), the same user may have access to the corresponding vector embedding for the particular cell (this vector embedding may represent metadata of the particular database, e.g., of the particular cell). In some implementations, a particular database may be accessed (e.g., by a local agent) using Structured Query Language (SQL) database instructions, or a database-specific application programing interface (API) call. In some implementations, one or more models 134, e.g., such as large language model 133, may access the particular database using, e.g., (SQL) database instructions. In some cases, the particular database may perform and/or enforce access control, by using the user's identity that has been passed through to the particular database.

Access control extends to file systems (e.g., read/write/execute permissions), file folders, application programming interfaces (APIs), databases, scripts, executables, and/or other types of objects or information. For example, a particular operation to be executed by client agent 103*a* may create an electronic file in a particular folder, or append a row to a particular database, or create and send an email, or perform some other (combination of) task(s), provided that the user is allowed to do so. In other words, agents such as client agent 103*a*, client agent 103*b*, etc., are permitted to execute or perform tasks and/or operations that the user is permitted to execute or perform.

In some implementations, vector component 110 may be configured to convert prompts to vector embeddings, (e.g., using an embedding model as provided by OPENAI™, or another embedding model). For example, a prompt may be converted to a vector embedding (also referred to as an agent vector embedding and/or a retrieval vector embedding). In some implementations, vector component 110 may be configured to select a subset of a set of vector embeddings, e.g., based on a prompt and/or an agent vector embedding. For example, vector component 110 may select a first subset of a first set of vector embeddings based on a first prompt (and/or based on a first agent vector embedding based on the first prompt), a second subset of a second set of vector embeddings based on a second prompt (and/or based on a second agent vector embedding based on the second prompt), and so forth.

In some implementations, selections by vector component 110 may be based on a first type of comparisons, a second type of comparisons, and/or other types of comparisons. For example, a first type of comparisons may compare a vector embedding (e.g., a particular retrieval vector embedding) with other vector embeddings (e.g., as stored in vector database 135). In some implementations, such a comparison may be based on one or more of semantic distance, Euclidean distance, (cosine) similarity, and/or dot product similarity. For example, different words having similar meanings may have a smaller semantic distance (or more similarity) than unrelated words. For example, "fruit" and "juice" may have a smaller semantic distance than "tricycle" and "goldfish". As another example, a second type of comparisons may use keyword matching and/or keyword searching, in which two words need to match verbatim and/or to the letter. By way of non-limiting example, measuring similarity between vector embeddings may include calculating inner product, cosine similarity, Euclidean distance, Jaccard similarity, Manhattan similarity, and/or another similarity metric.

Model component 112 may be configured to generate prompts, provide generated prompts and other information to one or more machine learning models 134, including large language model 133, and obtain replies from one or more machine learning models 134 to the generated prompts. Model component 112 may generate prompts (system-generated prompts, as opposed to user-generated prompts) to create plans for executing sets of operations. For example, model component 112 may generate a particular system-generated prompt for one or more machine learning models 134 to create a particular plan. The particular plan may execute a particular set of operations (such as, e.g., the set of operations entailed in a particular user-generated prompt, which may include a first operation, a second operation, and or more additional operations). Subsequently, model component 112 may provide prompts to one or more machine learning models 134. For example, model component 112 may provide a particular system-generated prompt to one or more machine learning models 134 to create the particular plan. Subsequently, model component 112 may obtain replies to provided prompts from one or more machine learning models 134. For example, model component 112 may obtain a particular reply from one or more machine learning models 134 to the particular system-generated prompt as provided. The particular reply may represent the particular plan for executing a set of operations. For example, the particular plan may include a first operation to be executed by a first client agent (say, client agent 103*a*), a second operation to be executed by a second client agent (say, client agent 103*b*), and so forth.

Subsequently, model component 112 may generate plan-specific prompts for client agents to execute particular operations, in accordance with particular plans. For example, model component 112 may generate a first (plan-specific) prompt for client agent 103*a* to execute a first operation, a second (plan-specific) prompt for client agent 103*b* to execute a second operation, and so forth. Subsequently, model component 112 may provide generated (plan-specific) prompts to client agents. For example, a first (plan-specific) prompt may be provided to client agent 103*b*, a second (plan-specific) prompt may be provided to client agent 103*b*, and so forth. Model component 112 may obtain (plan-specific) replies from client agents. For example, a first (plan-specific) reply may be obtained from client agent 103*a*, a second (plan-specific) reply may be obtained from client agent 103*b*, and so forth.

In some implementations, model component 112 obtains (references to) sets or subsets of vector embeddings from vector databases 135. Model component 112 may provide (references to) sets or subsets of vector embeddings to a particular large language model 133, e.g., as context for a particular prompt. In some implementations, model component 112 provides (references to) sets of document segments to a particular large language model 133, e.g., as context for a particular prompt. In some implementations, model component 112 provides other information to a particular large language model 133 as context for a particular prompt. Operations by model component 112 (and/or other components of system 100) may be performed responsive to one or more verifications by access component 118.

In some implementations, large language model 133 has been trained on at least a million electronic files. In some implementations, large language model 133 has been trained on at least 100 million electronic files. In some implementations, large language model 133 may include and/or be based on a neural network using over a billion parameters and/or weights. In some implementations, large language model 133 may include and/or be based on a neural network using over a 100 billion parameters and/or weights. In some implementations, large language model 133 may be based on Generative Pre-trained Transformer 3 (GPT3). In some implementations, large language model 133 may be based on GPT3.5 or GPT4, as developed by OPENAI™. In some implementations, large language model 133 may be (derived from) Generative Pre-trained Transformer 3 (GPT3) or a successor of Generative Pre-trained Transformer 3 (GPT3). In some implementations, large language model 133 may be (derived from) Large Language Model Meta AI (LLAMA) by META™, or a successor. In some implementations, large language model 133 may be (derived from) PALM2™ by GOOGLE™, or a successor.

Reply component 119 may be configured to generate replies to prompts, in particular user-generated prompts. Replies may be based on combining multiple plan-specific replies obtained from different client agents. In some cases, replies represent the execution of particular plans. For example, a particular reply may represent the execution of a particular plan that corresponds to a particular set of operations, the particular set of operations being entailed in a particular user-generated prompt. By way of non-limiting example, the generation of a particular reply may be based on a first plan-specific reply (from first client agent 103a), a second plan-specific reply, for the same plan (from second client agent 103b), and/or other replies. In some implementations, the first and second reply may serve as inputs to one or more tools to generate the particular reply. For example, the particular reply may be derived arithmetically from the first and second reply as input. In some cases, functionality attributed to reply component 119 may be performed by other components of system 100, including but not limited to interface component 102.

Referring to FIG. 1, presentation component 116 may be configured to generate, effectuate, and/or present presentations, notifications, and/or user interfaces 128 (e.g., on client computing platforms 104) to users 127. For example, presentation component 116 may be configured to present a particular user interface 128 on a particular client computing platform 104 to a particular user. In some implementations, particular user interface 128 may be configured to obtain (entry of) user input from a particular user. For example, the user input may represent a particular user prompt from the particular user (e.g., to be provided to one or more models 134, such as large language model 133). In some implementations, the user input may select one or more electronic files, including but not limited to a set of electronic files. In some implementations, the one or more electronic files may be provided as input and/or context to extract information, to generate information, and/or to otherwise perform tasks and/or operations. In some implementations, particular user interface 128 may be configured to present a particular reply, e.g., as generated by reply component 119, to a particular user.

Referring to FIG. 1, in some implementations, presentation component 116 may be configured to present one or more graphical user interface elements on one or more user interfaces 128, e.g., responsive to a selection by a user (e.g., through user input received by interface component 114). In some implementations, presentation component 116 may present particular information in a particular portion of particular user interface 128. In some implementations, presentation component 116 may be configured to notify users if (all or part of) particular user prompts cannot be accepted, e.g., due to failing one or more verifications by access component 118. For example, presentation component 116 may notify a particular user that the particular user does not have access to (a particular part of) a particular electronic file, or files.

User interfaces 128 may be configured to enable users 127 to control (e.g., through user input) the extraction or generation of information from one or more electronic files, and/or to otherwise perform tasks and/or operations. Any of these may be performed using large language model 133 (e.g., using one or more particular electronic files as input and/or context). In some implementations, the extraction or generation of information may be user-directed, i.e., controlled by an individual one of users 127 through user input into a particular user interface 128.

Referring to FIG. 1, as used herein, the term "extract" and its variants refer to the process of identifying and/or interpreting information that is included in one or more electronic files, whether performed by determining, measuring, calculating, computing, estimating, approximating, interpreting, generating, and/or otherwise deriving the information, and/or any combination thereof. In some implementations, extracted information may have a semantic meaning, including but not limited to opinions, judgement, classification, and/or other meaning that may be attributed to (human and/or machine-powered) interpretation. For example, in some implementations, some types of extracted information need not literally be included in a particular electronic source document, but may be a conclusion, classification, and/or other type of result of (human and/or machine-powered) interpretation of the contents of the particular electronic source document.

In some implementations, agent/server 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which agent/server 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 120 may include sources of information outside of system 100, external entities participating with system 100, and/or other resources. In some implementations, external resources 120 may include a provider of electronic files, including but not limited to electronic files 123, from which system 100 and/or its components (e.g., segment component 108) may obtain electronic files. In some implementations, external resources 120 may include a provider of information and/or models, including but not limited to extracted information 125, model(s) 134, and/or other information from which system 100 and/or its components may obtain information and/or input. In some implementations, some or all of the functionality attributed herein to external resources 120 may be provided by resources included in system 100.

Agent/server 102 may include electronic storage 122, one or more processors 124, and/or other components. Agent/server 102 may include communication lines, or ports to enable the exchange of information with a network and/or other computing platforms. Illustration of agent/server 102 in FIG. 1 is not intended to be limiting. Agent/server 102 may include a plurality of hardware, software, and/or firmware components operating together to provide the functionality attributed herein to agent/server 102. For example, agent/server 102 may be implemented by a cloud of computing platforms operating together as agent/server 102. In some implementations, some or all of the functionality attributed herein to agent/server 102 and/or system 100 may be provided by resources included in one or more client computing platform(s) 104.

Electronic storage 122 may comprise non-transitory storage media that electronically stores information. The electronic storage media of electronic storage 122 may include one or more of system storage that is provided integrally (i.e., substantially non-removable) with agent/server 102, removable storage that is removably connectable or couplable to agent/server 102 via, for example, a port (e.g., a USB port, a firewire port, etc.) or a drive (e.g., a disk drive, etc.), and/or local storage provided by one or more client computing platforms 104, external resources 120, and/or other components of system 100 or connected or coupled to system 100. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from agent/server 102, information received from client computing platform(s) 104, and/or other information that enables agent/server 102 to function as described herein.

Processor(s) 124 may be configured to provide information processing capabilities in agent/server 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, 116, 118, and/or 119, and/or other components. Processor(s) 124 may be configured to execute components 108, 110, 112, 114, 116, 118, and/or 119, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, and/or 119 are illustrated in FIG. 1 as being implemented within a single processing unit, in implementations in which processor(s) 124 includes multiple processing units, one or more of components 108, 110, 112, 114, 116, 118, and/or 119 may be implemented remotely from the other components. The description of the functionality provided by the different components 108, 110, 112, 114, 116, 118, and/or 119 described below is for illustrative purposes, and is not intended to be limiting, as any of components 108, 110, 112, 114, 116, 118, and/or 119 may provide more or less functionality than is described. For example, one or more of components 108, 110, 112, 114, 116, 118, and/or 119 may be eliminated, and some or all of its functionality may be provided by other ones of components 108, 110, 112, 114, 116, 118, and/or 119. As another example, processor(s) 124 may be configured to execute one or more additional components that may perform some or all of the functionality attributed below to one of components 108, 110, 112, 114, 116, 118, and/or 119.

FIG. 3 illustrates a system 100b configured for providing federated task performance controlled by agents, in accordance with one or more implementations. As depicted, and by way of non-limiting example, system 100b includes many of the same elements as depicted for system 100 in FIG. 1. As depicted in FIG. 3, a client agent such as client agent 103a may in turn control, delegate, and/or collaborate with lower level client agents such as (sub-client) agent 103c and (sub-client) agent 103d, via a communication network 13a. Likewise, client agent 103b may in turn control, delegate, and/or collaborate with lower level client agents such as (sub-client) agent 103e and (sub-client) agent 103f, via a communication network 13b, such that the (client) agents in system 100b form a hierarchy. This hierarchy may resemble and/or correspond to the organization hierarchy of a corporation or other commercial entity. In some cases, a particular low level agent may be shared among higher level agents. Individual agents may disaggregate work to downstream agents. In some cases, communication network 13a and communication network 13b may be a network such as the Internet and/or such as other networks, e.g., network 13.

Client agent 103a, client agent 103b, and/or other (client) agents may be the same as or similar to agent/server 102 depicted in FIG. 1. The systems and methods described and envisioned in this disclosure are not limited to three (client) agents, but can use any plurality.

FIG. 2 illustrates a method 200 of providing federated task performance controlled by agents, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting. In some implementations, at least some of the operations of method 200 may be performed in parallel. For example, steps 210-214 and steps 216-220 may occur in parallel. More generally, operations performed by different client agents may occur in parallel.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, user input is received from a user. The user input represents a user-generated prompt. The user-generated prompt entails a set of operations. In some embodiments, operation 202 is performed by an interface component the same as or similar to interface component 114 (shown in FIG. 1 and described herein).

At an operation 204, a system-generated prompt is generated for one or more machine learning models to create a plan for executing the set of operations. In some embodiments, operation 204 is performed by a prompt component and/or a model component the same as or similar to prompt component 108 and/or model component 112 (shown in FIG. 1 and described herein).

At an operation 206, the system-generated prompt is provided to the one or more machine learning models. In some embodiments, operation 206 is performed by a model component the same as or similar to model component 112 (shown in FIG. 1 and described herein).

At an operation 208, a particular reply is obtained from the one or more machine learning models. The particular reply represents the plan for executing the set of operations. The plan includes a first operation to be executed by a first client agent and a second operation to be executed by a second client agent. In some embodiments, operation 208 is performed by a model component the same as or similar to model component 112 (shown in FIG. 1 and described herein).

At an operation 210, a first plan-specific prompt is generated for the first client agent to execute the first operation. In some embodiments, operation 210 is performed by a prompt component and/or a model component the same as or similar to prompt component 108 and/or model component 112 (shown in FIG. 1 and described herein).

At an operation 212, the first plan-specific prompt is provided to the first client agent to execute the first operation. In some embodiments, operation 212 is performed by a model component the same as or similar to model component 112 (shown in FIG. 1 and described herein).

At an operation 214, a first plan-specific reply is obtained from the first client agent in response to the first plan-specific prompt. In some embodiments, operation 214 is performed by an agent the same as or similar to agent 103*a* (shown in FIG. 1 and described herein).

At an operation 216, a second plan-specific prompt is generated for the second client agent to execute the second operation. In some embodiments, operation 216 is performed by a prompt component and/or a model component the same as or similar to prompt component 108 and/or model component 112 (shown in FIG. 1 and described herein).

At an operation 218, the second plan-specific prompt is provided to the second client agent to execute the second operation. In some embodiments, operation 218 is performed by a model component the same as or similar to model component 112 (shown in FIG. 1 and described herein).

At an operation 220, a second plan-specific reply is obtained from the second client agent in response to the second plan-specific prompt. In some embodiments, operation 220 is performed by an agent the same as or similar to agent 103*b* (shown in FIG. 1 and described herein).

At an operation 222, a reply is generated to the user-generated prompt. Generation of the reply is based on the first plan-specific reply and the second plan-specific reply. The reply represents execution of the plan. In some embodiments, operation 222 is performed by a reply component the same as or similar to reply component 119 (shown in FIG. 1 and described herein).

At an operation 224, a presentation is effectuated of the reply to a user, through a user interface. In some embodiments, operation 224 is performed by a presentation component the same as or similar to presentation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide federated task performance controlled by agents, the system comprising:
  one or more hardware processors configured by machine readable instructions to:
    receive, from a user, user input representing a user-generated prompt, wherein the user-generated prompt entails a set of operations, wherein the user is identified by identity information;
    generate a system-generated prompt for one or more machine learning models to create a plan for executing the set of operations;
    provide the system-generated prompt to the one or more machine learning models;
    obtain a particular reply from the one or more machine learning models, wherein the particular reply represents the plan for executing the set of operations, wherein the plan includes a first operation to be executed by a first client agent and a second operation to be executed by a second client agent, wherein execution of the first operation requires access to a first set of electronic files;
    generate a first plan-specific prompt for the first client agent to execute the first operation;
    provide the first plan-specific prompt to the first client agent to execute the first operation, wherein the first plan-specific prompt to the first client agent is accompanied by the identity information, and wherein the first client agent uses role-based access control (RBAC) to verify the access to the first set of electronic files based on the identity information;
    obtain a first plan-specific reply from the first client agent in response to the first plan-specific prompt;
    generate a second plan-specific prompt for the second client agent to execute the second operation;
    provide the second plan-specific prompt to the second client agent to execute the second operation;

obtain a second plan-specific reply from the second client agent in response to the second plan-specific prompt;

generate a reply to the user-generated prompt, wherein generation of the reply is based on the first plan-specific reply and the second plan-specific reply, and wherein the reply is based on execution of the plan; and effectuate a presentation of the reply to the user, through a user interface;

wherein the first client agent is configured to:

(i) split the first operation into a first sub-operation and a second sub-operation, (ii) provide a first sub-prompt to a first sub-client agent of the first client agent to execute the first sub-operation, wherein the first sub-prompt to the first sub-client agent is accompanied by the identity information, and wherein the first sub-client agent uses role-based access control (RBAC) to verify the access to the first set of electronic files based on the identity information, (iii) provide a second sub-prompt to a second sub-client agent of the first client agent to execute the second sub-operation, wherein the second sub-prompt to the second sub-client agent is accompanied by the identity information, and wherein the second sub-client agent uses role-based access control (RBAC) to verify the access to the first set of electronic files based on the identity information, (iv) obtain a first sub-reply from the first sub-client agent and a second sub-reply from the second sub-client agent, wherein the first plan-specific reply is based on the first sub-reply and the second sub-reply, wherein the second client agent is configured to:

(i) split the second operation into a third sub-operation and a fourth sub-operation, (ii) provide a third sub-prompt to a third sub-client agent of the second client agent to execute the third sub-operation, (iii) provide a fourth sub-prompt to a fourth sub-client agent of the second client agent to execute the fourth sub-operation, (iv) obtain a third sub-reply from the third sub-client agent and a fourth sub-reply from the fourth sub-client agent, wherein the second plan-specific reply is based on the third sub-reply and the fourth sub-reply, wherein the first client agent, the second client agent, the first sub-client agent, the second sub-client agent, the third sub-client agent, and the fourth sub-client agent form a hierarchy of client agents in which the first client agent and the second client agent are higher level client agents and in which the first sub-client agent, the second sub-client agent, the third sub-client agent, and the fourth sub-client agent are lower level client agents below the higher level client agents.

2. The system of claim 1, wherein the second operation is associated with a second set of electronic files.

3. The system of claim 2, wherein execution of the second operation requires access to the second set of electronic files.

4. The system of claim 3, wherein the identity information is passed down to the second client agent to determine whether the user has access to the second set of electronic files.

5. The system of claim 1, wherein a first vector database is configured to store a first set of vector embeddings representing content within the first set of electronic files, wherein the one or more hardware processors are further configured to:

select a first subset of the first set of vector embeddings based on the first plan-specific prompt; and provide the first subset of the first set of vector embeddings to the first client agent as context for the first plan-specific prompt.

6. The system of claim 2, wherein the second set of electronic files includes a database configured to be accessed through Structured Query Language (SQL) database instructions, wherein the second client agent accesses the database through the SQL database instructions, and wherein execution of the second operation includes modifying contents of the database through one or more of the SQL database instructions.

7. The system of claim 1, wherein execution of the set of operations includes reporting information regarding the execution of the set of operations via email.

8. The system of claim 1, wherein the one or more hardware processors are further configured to:

verify whether the reply is responsive to the user-generated prompt.

9. The system of claim 1, wherein the plan is a step-by-step plan.

10. A method of providing federated task performance controlled by agents, the method being implemented in a computer system that includes one or more hardware processors, the method comprising:

receiving, from a user, user input representing a user-generated prompt, wherein the user-generated prompt entails a set of operations, wherein the user is identified by identity information;

generating a system-generated prompt for one or more machine learning models to create a plan for executing the set of operations;

providing the system-generated prompt to the one or more machine learning models;

obtaining a particular reply from the one or more machine learning models, wherein the particular reply represents the plan for executing the set of operations, wherein the plan includes a first operation to be executed by a first client agent and a second operation to be executed by a second client agent, wherein execution of the first operation requires access to a first set of electronic files;

generating a first plan-specific prompt for the first client agent to execute the first operation;

providing the first plan-specific prompt to the first client agent to execute the first operation, wherein the first plan-specific prompt to the first client agent is accompanied by the identity information, and wherein the first client agent uses role-based access control (RBAC) to verify the access to the first set of electronic files based on the identity information;

obtaining a first plan-specific reply from the first client agent in response to the first plan-specific prompt;

generating a second plan-specific prompt for the second client agent to execute the second operation;

providing the second plan-specific prompt to the second client agent to execute the second operation;

obtaining a second plan-specific reply from the second client agent in response to the second plan-specific prompt;

generating a reply to the user-generated prompt, wherein generation of the reply is based on the first plan-specific reply and the second plan-specific reply, and wherein
the reply is based on execution of the plan; and
effectuating a presentation of the reply to the user, through
a user interface
wherein the first client agent:
   (i) splits the first operation into a first sub-operation and
a second sub-operation,
   (ii) provides a first sub-prompt to a first sub-client agent
of the first client agent to execute the first sub-
operation, wherein the first sub-prompt to the first
sub-client agent is accompanied by the identity infor-
mation, and wherein the first sub-client agent uses
role-based access control (RBAC) to verify the
access to the first set of electronic files based on the
identity information,
   (iii) provides a second sub-prompt to a second sub-
client agent of the first client agent to execute the
second sub-operation, wherein the second sub-
prompt to the second sub-client agent is accompa-
nied by the identity information, and wherein the
second sub-client agent uses role-based access con-
trol (RBAC) to verify the access to the first set of
electronic files based on the identity information,
   (iv) obtains a first sub-reply from the first sub-client
agent and a second sub-reply from the second sub-
client agent, wherein the first plan-specific reply is
based on the first sub-reply and the second sub-reply,
wherein the second client agent:
   (i) splits the second operation into a third sub-operation
and a fourth sub-operation,
   (ii) provides a third sub-prompt to a third sub-client
agent of the second client agent to execute the third
sub-operation,
   (iii) provides a fourth sub-prompt to a fourth sub-client
agent of the second client agent to execute the fourth
sub-operation,
   (iv) obtains a third sub-reply from the third sub-client
agent and a fourth sub-reply from the fourth sub-
client agent, wherein the second plan-specific reply
is based on the third sub-reply and the fourth sub-
reply,
wherein the first client agent, the second client agent, the
first sub-client agent, the second sub-client agent, the
third sub-client agent, and the fourth sub-client agent
form a hierarchy of client agents in which the first client
agent and the second client agent are higher level client
agents and in which the first sub-client agent, the
second sub-client agent, the third sub-client agent, and
the fourth sub-client agent are lower level client agents
below the higher level client agents.

11. The method of claim 10, wherein the second operation
is associated with a second set of electronic files.

12. The method of claim 11, wherein execution of the
second operation requires access to the second set of elec-
tronic files.

13. The method of claim 12, wherein the identity infor-
mation is passed down to the second client agent to deter-
mine whether the user has access to the second set of
electronic files.

14. The method of claim 10, wherein a first vector
database stores a first set of vector embeddings representing
content within the first set of electronic files, the method
further comprising:
   selecting a first subset of the first set of vector embeddings
based on the first plan-specific prompt; and
   providing the first subset of the first set of vector embed-
dings to the first client agent as context for the first
plan-specific prompt.

15. The method of claim 11, wherein the second set of
electronic files includes a database that is accessible through
Structured Query Language (SQL) database instructions,
wherein the second client agent accesses the database
through the SQL database instructions, and wherein execu-
tion of the second operation includes modifying contents of
the database through one or more of the SQL database
instructions.

16. The method of claim 10, wherein execution of the set
of operations includes reporting information regarding the
execution of the set of operations via email.

17. The method of claim 10, further comprising:
   verifying whether the reply is responsive to the user-
generated prompt.

18. The method of claim 10, wherein the plan is a
step-by-step plan.

* * * * *